(12) United States Patent
Wada et al.

(10) Patent No.: US 12,345,929 B2
(45) Date of Patent: Jul. 1, 2025

(54) FERRULE FOR OPTICAL CONNECTOR

(71) Applicant: Fujikura Ltd., Tokyo (JP)

(72) Inventors: Yasuyuki Wada, Sakura (JP); Ken Kusakata, Sakura (JP)

(73) Assignee: Fujikura Ltd., Tokyo (JP)

( * ) Notice: Subject to any disclaimer, the term of this patent is extended or adjusted under 35 U.S.C. 154(b) by 255 days.

(21) Appl. No.: 18/006,621

(22) PCT Filed: Jul. 16, 2021

(86) PCT No.: PCT/JP2021/026732
§ 371 (c)(1),
(2) Date: Jan. 24, 2023

(87) PCT Pub. No.: WO2022/113421
PCT Pub. Date: Jun. 2, 2022

(65) Prior Publication Data
US 2023/0273378 A1     Aug. 31, 2023

(30) Foreign Application Priority Data

Nov. 24, 2020   (JP) .................................. 2020-194493
Dec. 8, 2020    (JP) .................................. 2020-203498

(51) Int. Cl.
*G02B 6/36*     (2006.01)
*G02B 6/40*     (2006.01)

(52) U.S. Cl.
CPC .................................. *G02B 6/403* (2013.01)

(58) Field of Classification Search
CPC .... G02B 6/403; G02B 6/3834; G02B 6/3644; G02B 6/3885; G02B 6/38
See application file for complete search history.

(56) References Cited

U.S. PATENT DOCUMENTS

| 6,481,900 | B1 | 11/2002 | Maeno et al. |
| 9,632,258 | B2 | 4/2017 | Nishimura |

(Continued)

FOREIGN PATENT DOCUMENTS

| CN | 206601505 U | 10/2017 |
| EP | 1061390 A1 | 12/2000 |

(Continued)

OTHER PUBLICATIONS

International Search Report issued in related International Application No. PCT/JP2021/026497 mailed Oct. 12, 2021 (3 pages).

(Continued)

*Primary Examiner* — Jennifer Doan
(74) *Attorney, Agent, or Firm* — Osha Bergman Watanabe & Burton LLP

(57) ABSTRACT

A ferrule for an optical connector includes: a ferrule main body including: a connection end surface; an upper surface; a lower surface opposite to the upper surface in a vertical direction, and fiber holes into which optical fibers are inserted along a front-rear direction perpendicular to the vertical direction, and that are arranged in a left-right direction perpendicular to the vertical direction and the front-rear direction. The connection end surface is disposed on a front side in the front-rear direction. Inner diameters of rear end openings of the fiber holes are in a range of 204.6 to 230.0 μm, wherein the rear end openings are disposed on a rear side opposite to the front side in the front-rear direction. A wall surface covers an entirety of the upper surface and the lower surface.

3 Claims, 3 Drawing Sheets

(56) References Cited

U.S. PATENT DOCUMENTS

| | | | |
|---|---|---|---|
| 10,901,155 B2* | 1/2021 | Lu ........................ | G02B 6/3893 |
| 2004/0161205 A1 | 8/2004 | Hengelmolen et al. | |
| 2011/0044589 A1* | 2/2011 | Takaoka ............... | G02B 6/3885 |
| | | | 385/83 |

FOREIGN PATENT DOCUMENTS

| | | |
|---|---|---|
| JP | S63-80510 U | 5/1988 |
| JP | H04-314008 A | 11/1992 |
| JP | H11-109161 A | 4/1999 |
| JP | 2000-111761 A | 4/2000 |
| JP | 2001-004872 A | 1/2001 |
| JP | 2001-324650 A | 11/2001 |
| JP | 2004-086069 A | 3/2004 |
| JP | 2004-219797 A | 8/2004 |
| JP | 2007-212600 A | 8/2007 |
| JP | 2009-157143 A | 7/2009 |
| JP | 2015-179267 A | 10/2015 |
| JP | 2017-191211 A | 10/2017 |
| WO | 2012/108324 A1 | 8/2012 |

OTHER PUBLICATIONS

International Search Report issued in corresponding International Application No. PCT/JP2021/026732 mailed Oct. 12, 2021 (3 pages).

* cited by examiner

FERRULE FOR OPTICAL CONNECTOR

BACKGROUND

Technical Field

The present invention relates to a ferrule for an optical connector.

Description of Related Art

Patent Document 1 discloses a ferrule for an optical connector. A plurality of fiber holes, a plurality of fiber grooves, and an adhesive injection window are formed in the ferrule. Optical fibers are inserted into the fiber holes. The fiber grooves each extend toward a rear side from the fiber holes. The fiber groove guides the optical fiber toward the fiber hole when the optical connector is assembled. The adhesive injection window is formed in an upper surface or a lower surface of the ferrule. The adhesive injection window is used to inject an adhesive for fixing the optical fiber into the ferrule. Generally, the ferrule is formed by injection molding.

PATENT DOCUMENT

Patent Document 1: JP No. 2015-179267

SUMMARY

In order to connect more optical fibers within a limited space, a ferrule is required to be miniaturized. As a result of intensive studies by the inventors of the present application, it has been found that, when a ferrule is miniaturized, from the perspective of a strength of the mold, it is difficult to form a fiber groove for introducing an optical fiber into a fiber hole. In a ferrule without a fiber groove, it is difficult to secure workability in assembling an optical connector.

One or more embodiments may provide a ferrule for an optical connector which is small in size and capable of securing workability in assembling an optical connector.

An ferrule for an optical connector according to one or more embodiments includes a ferrule main body in which a plurality of fiber holes into which optical fibers are inserted are formed, in which when a direction in which the plurality of fiber holes extend is defined as a front-rear direction, a direction in which the plurality of fiber holes are arranged is defined as a left-right direction, a direction perpendicular to both the front-rear direction and the left-right direction is defined as a vertical direction, a side on which a connection end surface of the ferrule main body is positioned in the front-rear direction is defined as a front side, and a side opposite to the front side is defined as a rear side, inner diameters of rear end openings of the plurality of fiber holes are in a range of 204.6 to 230.0 µm, and an upper surface and a lower surface of the ferrule main body are all covered with a wall surface.

According to one or more embodiments, even if a position of a distal end of each optical fiber varies due to removal of an outer jacket of the fiber ribbon, it is possible to insert the optical fiber into the fiber hole because an inner diameter of the rear end opening of the fiber hole is 204.6 µm or more. Therefore, even if the upper surface and the lower surface of the ferrule main body are all covered with a wall surface and this makes it difficult to form a guide groove, it is possible to secure workability in assembling the optical connector. Also, when the inner diameter is 230.0 µm or less, it is possible to make a distance between the rear end openings of adjacent fiber holes to be 20 µm or more. Accordingly, it is possible to secure a strength of the mold for injection-molding the ferrule.

According to one or more embodiments, the inner diameters of the rear end openings may be 225.0 µm or more.

According to one or more embodiments, inclined surfaces having conical shapes with inner diameters decreasing in a direction toward the front side may be formed at rear end portions of the plurality of fiber holes, and the rear end openings may be rear end portions of the inclined surfaces.

According to one or more embodiments, it is possible to provide a ferrule for an optical connector which is small in size and capable of securing workability in assembling an optical connector.

DETAILED DESCRIPTION OF THE EMBODIMENTS

Hereinafter, a ferrule for an optical connector and an optical connector according to one or more embodiments will be described on the basis of the drawings.

Figure 1:
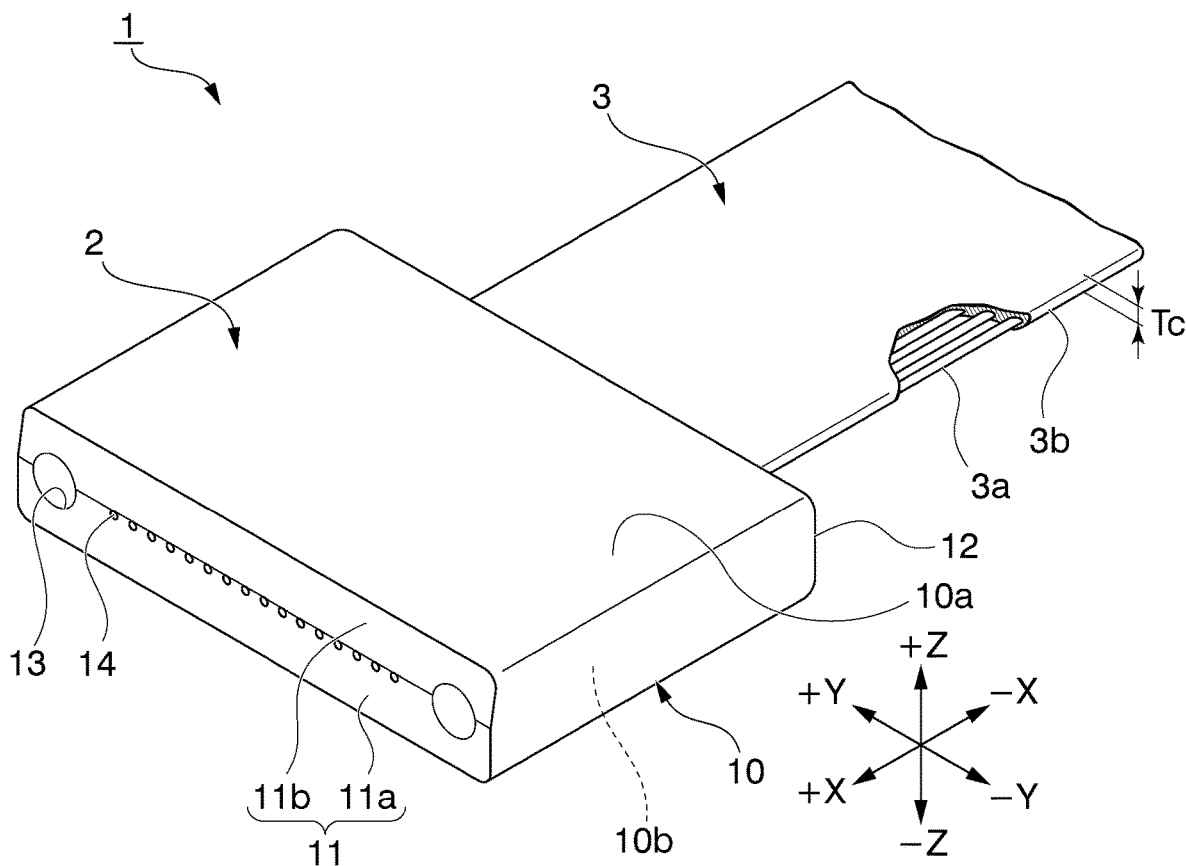
FIG. 1 is a perspective view of an optical connector according to one or more embodiments.

As illustrated in FIG. 1, an optical connector 1 includes a ferrule 2 (ferrule for an optical connector) and a fiber ribbon 3. The fiber ribbon 3 includes a plurality of optical fibers 3a which are bonded each other. The fiber ribbon 3 illustrated in FIG. 1 is of a so-called batch coating-type in which the plurality of optical fibers 3a are integrally coated with an outer jacket 3b. However, the fiber ribbon 3 may be of a so-called intermittently bonded-type in which the plurality of optical fibers 3a are intermittently bonded to be fixed. Alternatively, other types of the fiber ribbon 3 may be used as long as the plurality of optical fibers 3a are bundled.

The ferrule 2 includes a ferrule main body 10 in which a plurality of fiber holes 14 into which the optical fibers 3a are inserted are formed. Further, the ferrule 2 may include a portion other than the ferrule main body 10. The ferrule main body 10 has a connection end surface 11 at which the fiber holes 14 open.

(Definition of Directions)

In the present specification, a direction in which the plurality of fiber holes 14 extend is referred to as a front-rear direction X, and a direction in which the plurality of fiber holes 14 are arranged is referred to as a left-right direction Y. A direction perpendicular to both the front-rear direction X and the left-right direction Y is referred to as a vertical direction Z. In the front-rear direction X, a side (+X side) on which the connection end surface 11 of the ferrule main body 10 is positioned is referred to as a front side or a distal end side. A side (−X side) opposite to the distal end side is referred to as a rear side or a base end side. One side (+Z side) in the vertical direction Z is referred to as an upper side. A side (−Z side) opposite to the upper side is referred to as a lower side. One side (+Y side) in the left-right direction Y is referred to as a left side. A side (−Y side) opposite to the left side is referred to as a right side.

Figure 2:
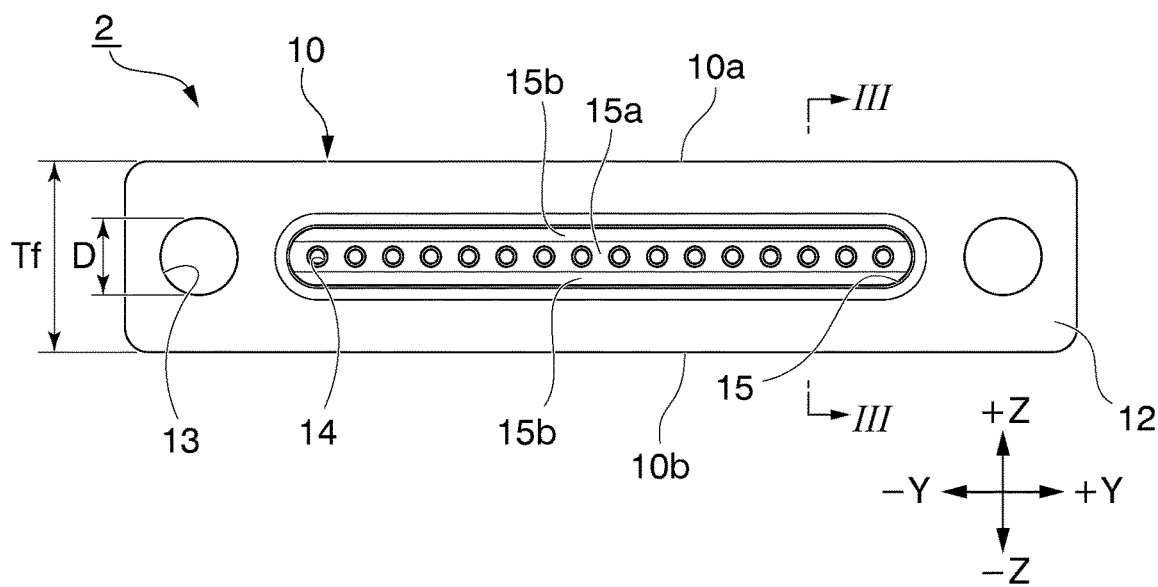
FIG. 2 is a view of a ferrule for the optical connector illustrated in FIG. 1 from a rear side.

As illustrated in FIGS. 1 and 2, the ferrule main body 10 includes the connection end surface 11 which is an end surface on the front side, a rear end surface 12, two guide holes 13, the plurality of fiber holes 14, and a recessed portion 15. The connection end surface 11 has a reference region 11a in the vertical direction Z and an inclined region 11b inclined with respect to the reference region 11a. The inclined region 11b prevents an influence due to return light of light emitted from the optical fibers 3a. The inclined region 11b is inclined toward the rear side as it goes upward.

The two guide holes 13 are disposed to sandwich the plurality of fiber holes 14 therebetween in the left-right direction Y. The guide holes 13 each extend in the front-rear direction X and penetrate the ferrule main body 10. As illustrated in FIGS. 1 and 2, a front end portion of the guide hole 13 opens at the connection end surface 11, and a rear end portion of the guide hole 13 opens at the rear end surface 12. A guide pin (not illustrated) is inserted into the guide hole 13. In the optical connector 1 on a male side, the guide pin is fixed to the ferrule main body 10 while being inserted into the guide hole 13. A method of fixing may be changed as appropriate. For example, an adhesive or the like may be used as a method of the fixing. The guide pin of the optical connector 1 on a male side is inserted into the guide hole 13 of the optical connector 1 on a female side. Thereby, positioning of the two optical connectors 1 is achieved. Also, the optical fibers 3a are exposed at the connection end surface 11 of the ferrule main body 10. Therefore, when the optical connectors 1 are connected to each other, the optical fibers 3a are optically connected to each other.

As illustrated in FIG. 2, in the present specification, a diameter of the guide hole 13 is expressed as D, and a thickness of the ferrule main body 10 in the vertical direction Z is expressed as Tf. In order to secure a positioning accuracy between the optical connectors 1 due to the guide pin, the diameter D of the guide hole 13 is required to be increased to a certain extent. This is because a diameter (thickness) of the guide pin and the diameter D of the guide hole 13 are substantially the same, and the positioning accuracy becomes more stable as the guide pin becomes more thicker. Also, in order to connect more optical fibers 3a within a limited space, the thickness Tf of the ferrule main body 10 is required to be reduced. As a result of intensive studies by the inventors of the present application, it has been found that it is possible to meet the above-described requirements by determining dimensions of the ferrule main body 10 to satisfy D/Tf>0.4.

Figure 3:
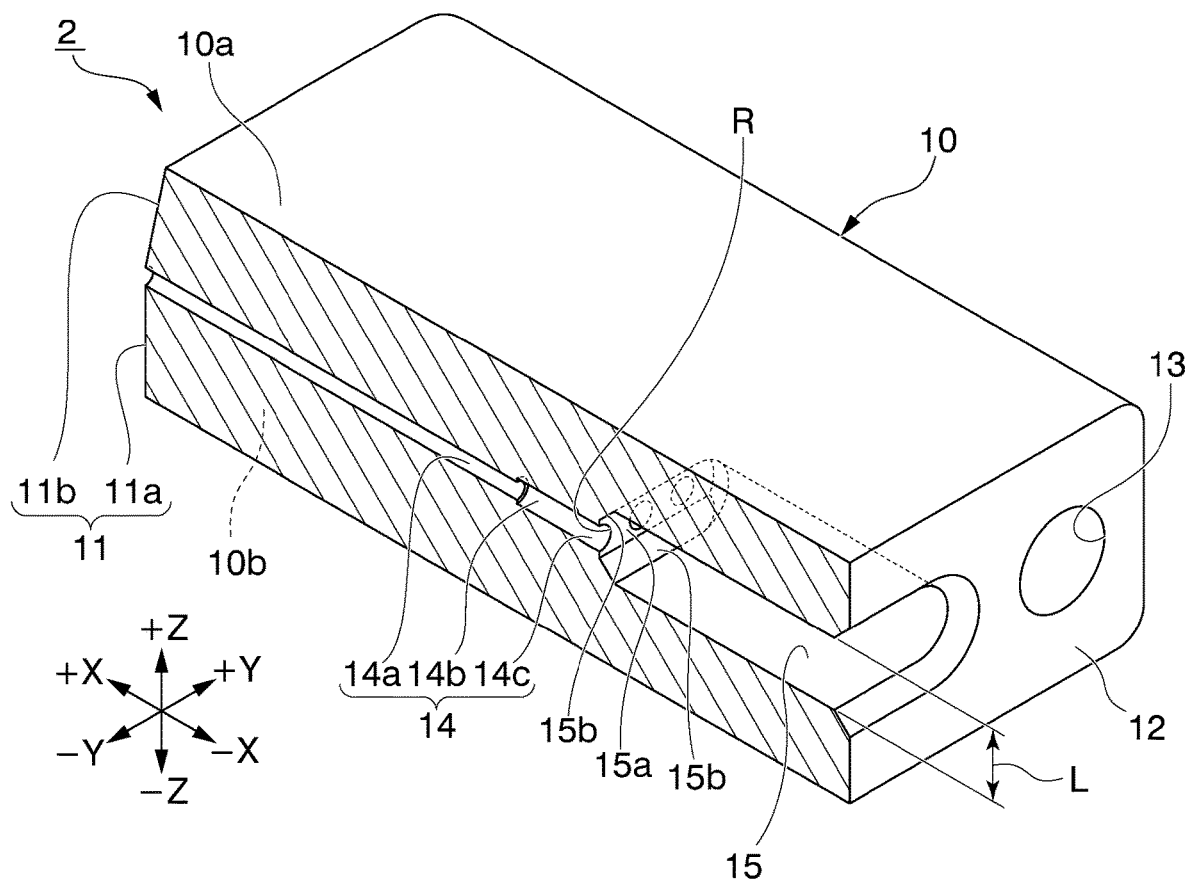
FIG. 3 is a partial cross-sectional view along line III-III of the ferrule for the optical connector illustrated in FIG. 2.

As illustrated in FIG. 3, the fiber holes 14 each include a small diameter portion 14a and an enlarged diameter portion 14b. The enlarged diameter portion 14b has a larger inner diameter than the small diameter portion 14a. The enlarged diameter portion 14b is positioned on a rear side with respect to the small diameter portion 14a. A portion of a glass part of each of the optical fibers 3a is inserted into the small diameter portion 14a. In one or more embodiments, an outer diameter of the glass part (dimension d to be described later) is 125 μm. A portion of a coating layer covering the glass part is inserted into the enlarged diameter portion 14b. Further, the fiber hole 14 may not have the small diameter portion 14a and the enlarged diameter portion 14b, and may have a constant inner diameter over the entire length.

As illustrated in FIGS. 2 and 3, the recessed portion 15 is recessed toward the front side from the rear end surface 12. When viewed from the rear side, an internal space of the recessed portion 15 has a horizontally-long flat shape. That is, a dimension of the internal space of the recessed portion 15 in the left-right direction Y is larger than a dimension thereof in the vertical direction Z. A rear end opening R of each fiber hole 14 is positioned on a bottom surface 15a (surface facing the rear side) of the recessed portion 15.

Two inclined surfaces 15b inclined toward the fiber holes 14 in a direction toward the front side are formed on the bottom surface 15a. The two inclined surfaces 15b are disposed to sandwich the plurality of fiber holes 14 therebetween in the vertical direction Z. Each of the inclined surfaces 15b extends in the left-right direction Y to overlap a region in which the plurality of fiber holes 14 are formed in the left-right direction Y. The inclined surface 15b positioned on an upper side is inclined downward in a direction toward the front side. The inclined surface 15b positioned on a lower side is inclined upward in a direction toward the front side.

Although not illustrated, the outer jacket 3b is removed at a front end portion of the fiber ribbon 3 and the optical fibers 3a are exposed. The front end portion of the fiber ribbon 3 is inserted into the recessed portion 15, and the optical fibers 3a are respectively inserted into the fiber holes 14. At this time, the inclined surfaces 15b formed in the recessed portion 15 serve the role of guiding the optical fibers 3a toward the fiber holes 14. An adhesive is injected into the recessed portion 15 with the optical fibers 3a inserted into the fiber holes 14. As a method of injecting the adhesive, for example, the adhesive is injected into the recessed portion 15 from a gap between an opening at a rear end of the recessed portion 15 and the fiber ribbon 3 using a dispenser. When the injected adhesive is cured, the optical fibers 3a and the ferrule main body 10 are fixed.

In this way, in one or more embodiments, the adhesive is injected into the ferrule main body 10 through the opening on the rear side of the recessed portion 15. In a conventional general ferrule for a connector, an adhesive injection window for injecting an adhesive has been formed in an upper surface 10a or a lower surface 10b. In one or more embodiments, the thickness Tf of the ferrule main body 10 is made extremely small (for example, 2 mm or less). Therefore, a strength of the ferrule main body 10 is less likely to be secured if the adhesive injection window is formed in the upper surface 10a or the lower surface 10b as in conventional cases. Therefore, a method of injecting the adhesive from the opening on the rear side of the recessed portion 15 is employed without forming the adhesive injection window in the upper surface 10a and the lower surface 10b of the ferrule main body 10. That is, the recessed portion 15 also functions as an adhesive injection hole.

A front end portion of the outer jacket 3b of the fiber ribbon 3 is inserted into the recessed portion 15. Therefore, not only the optical fibers 3a but also the outer jacket 3b are fixed to the ferrule main body 10 in the recessed portion 15 by the adhesive. As illustrated in FIG. 1, in the present specification, a thickness of the fiber ribbon 3 (thickness of the outer jacket 3b) in the vertical direction Z is expressed as Tc. Also, as illustrated in FIG. 3, a dimension of the internal space of the recessed portion 15 in the vertical direction Z is expressed as L. As a result of intensive studies by the inventors of the present application, when dimensions are set to satisfy 1<L/Tc<2, a position of the optical fiber 3a in the vertical direction Z is easily aligned with the fiber hole 14, and assembling workability is satisfactory. Also, more preferably, when 1<L/Tc<1.1 is satisfied, it is possible to make the assembling workability more satisfactory. As an example of the dimensions, it is possible to realize the ferrule 2 satisfying L=0.35 mm and Tc=0.32 mm. In this case, L/Tc=1.094.

It has also been found that the thickness Tf of the ferrule main body 10 in the vertical direction Z and the dimension L of the internal space of the recessed portion 15 preferably satisfy L/Tf<0.3. Further, flange parts protruding to the left and right sides from a ferrule main body have been provided in conventional general ferrules for optical connectors, but such flange parts are not provided in the ferrule 2 of one or more embodiments. By devising as described above, it is possible to reduce a size of the ferrule 2 further.

A fiber groove extending in the front-rear direction X to introduce the optical fiber 3a into the fiber hole 14 is not formed on an inner surface of the recessed portion 15. Here, as illustrated in FIG. 1, the optical fibers 3a in a state of being coated with the outer jacket 3b are fixed to maintain predetermined positions relative to each other. However, when the optical fibers 3a are inserted into the fiber holes 14, the outer jacket 3b is removed at a distal end portion of the fiber ribbon 3. When the outer jacket 3b is removed, the relative positions between the optical fibers 3a become unstable, and thus work of inserting the optical fibers 3a into the fiber holes 14 may become difficult.

Therefore, the inventors of the present application have conducted intensive studies on conditions for easily inserting the optical fiber 3a into the fiber hole 14. Hereinafter, description will be made in more detail using FIG. 4 and Table 1.

Figure 4:
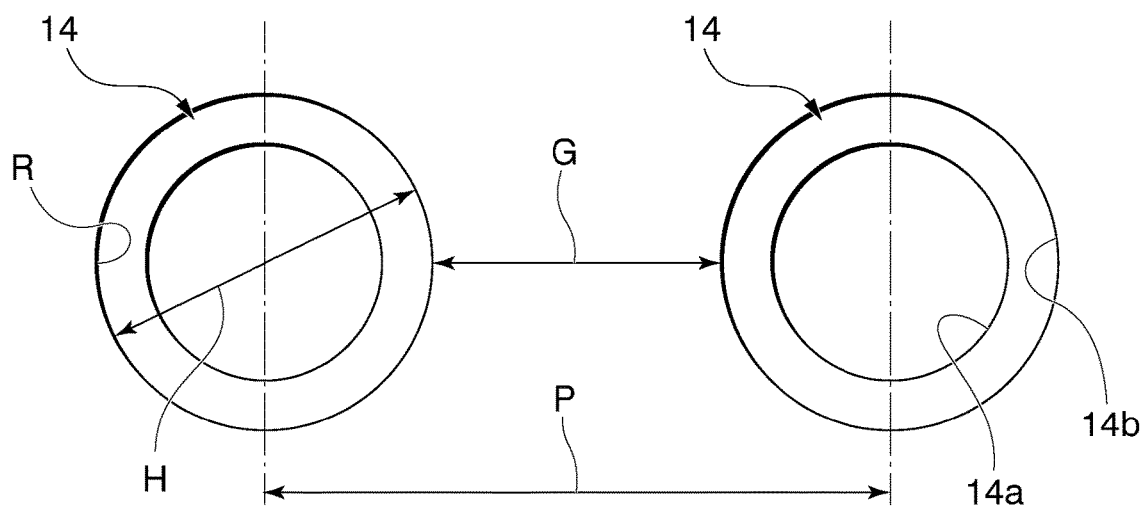
FIG. 4 is an enlarged view around a fiber hole illustrated in FIG. 2.

As illustrated in FIG. 4, in the following description, a distance between centers of adjacent fiber holes 14 is expressed as a pitch P. A distance between the rear end openings R of the adjacent fiber holes 14 is expressed as a gap G. The inner diameter of the rear end opening R of the fiber hole 14 is expressed as H. Although not illustrated, an outer diameter of the glass part of the optical fiber 3a is expressed as d. In the example of FIG. 4, the gap G is a distance between the rear end openings R of the enlarged diameter portions 14b of the adjacent fiber holes 14.

TABLE 1

| Optical fiber | Amount of deviation from designed position (μm) | | | | |
|---|---|---|---|---|---|
| | Sample 1 | Sample 2 | Sample 3 | Sample 4 | Sample 5 |
| 1 | 0.0 | 0.0 | 0.0 | 0.0 | 0.0 |
| 2 | 9.1 | 13.3 | 11.4 | 3.2 | 9.1 |
| 3 | 6.3 | 17.0 | 12.0 | 7.1 | 13.4 |
| 4 | 6.4 | 17.1 | 6.3 | 5.4 | 4.0 |
| 5 | 7.8 | 28.2 | 36.2 | 11.4 | 15.7 |
| 6 | 17.0 | 9.0 | 36.6 | 18.2 | 8.6 |
| 7 | 22.0 | 27.2 | 39.8 | 14.6 | 13.4 |
| 8 | 17.8 | 22.1 | 19.2 | 35.1 | 26.9 |
| 9 | 13.5 | 33.0 | 36.9 | 25.7 | 9.8 |
| 10 | 22.5 | 34.0 | 14.0 | 5.8 | 8.1 |
| 11 | 11.7 | 26.0 | 13.5 | 8.5 | 10.0 |
| 12 | 26.4 | 33.1 | 28.8 | 10.0 | 9.4 |
| 13 | 33.6 | 26.1 | 39.4 | 17.0 | 9.4 |
| 14 | 26.9 | 21.2 | 26.1 | 5.1 | 11.4 |
| 15 | 24.8 | 35.9 | 18.6 | 10.0 | 9.9 |
| 16 | 20.1 | 39.3 | 22.4 | 8.9 | 17.5 |
| Max | | | | | 39.8 |
| Ave | | | | | 17.2 |
| 3σ | | | | | 32.8 |
| Ave + 3σ | | | | | 50.0 |

As shown in Table 1, five fiber ribbons 3 (samples 1 to 5) were prepared. The samples 1 to 5 each have 16 optical fibers 3a. The 16 optical fibers 3a were numbered from 1 to 16 in order from an end portion on one side in the left-right direction Y. An amount of deviation (μm) of each optical fiber 3a from a designed position was measured when the outer jacket 3b was removed at a distal end portion of each of the samples 1 to 5. The "designed position" refers to a position in the left-right direction Y and the vertical direction Z at which the optical fiber 3a should originally be positioned. The designed position is substantially the same as a position of the optical fiber 3a in a state of being coated with the outer jacket 3b. After the distal end portion of the outer jacket 3b is removed, since the distal end portion of the optical fiber 3a is not fixed by the outer jacket 3b, each optical fiber 3a deviates from the designed position. Using a position of the first optical fiber 3a as a reference, an amount of deviation from the designed position of each optical fiber 3a was described in Table 1. For example, a second optical fiber 3a of the sample 1 was deviated from the designed position by 9.1 μm.

Amounts of deviation from designed positions of the optical fibers 3a of the samples 1 to 5 are aggregated and the result is shown on a side below Table 1. Specifically, a maximum value of the amount of deviation (hereinafter also referred to as Max) was 39.8 μm. Also, an average value of the amount of deviation (hereinafter also referred to as Ave) was 17.2 μm, and a value of 30 was 32.8 μm. 30 was a value obtained by multiplying the standard deviation (σ) by three.

Here, if the inner diameter (dimension H) of the rear end opening R of the fiber hole 14 and the outer diameter (dimension d) of the glass part of the optical fiber 3a satisfy the following mathematical expression (1), it is possible to insert the optical fiber 3a deviated from the designed position into the fiber hole 14 easily.

$$H \geq d + 2 \times \text{Max} \tag{1}$$

In one or more embodiments, the dimension d is 125 μm. Also, from Table 1, the value of Max is 39.8 μm. When these numerical values are substituted into mathematical expression (1), the following mathematical expression (1)' is obtained.

$$H \geq 204.6 \, [\mu m] \tag{1'}$$

That is, if the inner diameter of the rear end opening R of the fiber hole 14 is larger than 204.6 μm, it is even possible to insert the optical fiber 3a that is most deviated from the designed position into the fiber hole 14. Further, a shape of the rear end opening R of the fiber hole 14 is circular. Therefore, if mathematical expression (1)' is satisfied, it is possible to insert the optical fiber 3a into the fiber hole 14 even if the optical fiber 3a is deviated from the designed position by 39.8 μm in either the left-right direction Y or the front-rear direction X.

Next, an upper limit value of the dimension H will be described. The ferrule main body 10 is formed by injection molding. Therefore, if the gap G is too small, it becomes impossible to maintain strength of the mold. As a result of intensive studies by the inventors of the present application, it has been found that the gap G needs to be 20 μm or more to secure the strength of the mold. A relationship among the gap G, the pitch P, and the dimension H is expressed by the following mathematical expression (2).

$$P = G + H \tag{2}$$

In one or more embodiments, the pitch P is 250 μm. Therefore, a condition for the gap G to be 20 μm or more is expressed by mathematical expression (2)'.

$$H \leq 230 \, [\mu m] \tag{2'}$$

The following mathematical expression (3) is obtained from mathematical expressions (1)' and (2)'.

$$204.6\ [\mu m] \leq H \leq 230\ [\mu m] \quad (3)$$

In the ferrule 2 of one or more embodiments, the dimension H is set to satisfy mathematical expression (3).

As described above, the ferrule 2 of one or more embodiments includes the ferrule main body 10 in which the plurality of fiber holes 14 into which the optical fibers 3a are inserted are formed. When a direction in which the plurality of fiber holes 14 extend is defined as a front-rear direction X, a direction in which the plurality of fiber holes 14 are arranged is defined as a left-right direction Y, a direction perpendicular to both the front-rear direction X and the left-right direction Y is defined as a vertical direction Z, a side on which the connection end surface 11 of the ferrule main body 10 is positioned in the front-rear direction X is defined as a front side, and a side opposite to the front side is defined as a rear side, inner diameters (dimension H) of the rear end openings R of the plurality of fiber holes 14 are in a range of 204.6 to 230.0 μm, and the upper surface 10a and the lower surface 10b of the ferrule main body 10 are all covered with a wall surface. Further, in one or more embodiments, the upper surface 10a (lower surface 10b) and the wall surface are not different surfaces but the same surface. In other words, a hole penetrating the upper surface 10a is not formed in the upper surface 10a. Similarly, a hole penetrating the lower surface 10b is not formed in the lower surface 10b.

According to the above-described configuration, even if a position of the distal end of each optical fiber 3a varies due to removal of the outer jacket 3b of the fiber ribbon 3, it is possible to insert the optical fiber 3a into the fiber hole 14 since the dimension H is 204.6 μm or more. Therefore, even if the upper surface 10a and the lower surface 10b of the ferrule main body 10 are all covered with a wall surface and this makes it difficult to form a guide groove, it is possible to secure workability in assembling the optical connector 1. Also, when the dimension H is 230.0 μm or less, it is possible to make a distance (gap G) between the rear end openings R of the fiber holes 14 to be 20 μm or more, and thereby it is possible to secure a strength of the mold for injection-molding the ferrule 2.

Also, the "maximum value (Max)" in mathematical expression (1) may be substituted with the "Ave+3σ" value (50.0 μm) shown in Table 1. In this case, a lower limit value of the dimension H is 225.0 μm. When an inner diameter (dimension H) of the rear end opening R of the fiber hole 14 is 225.0 μm or more, it is possible to insert the optical fiber 3a into the fiber hole 14 even if a position of the optical fiber 3a after removal of the outer jacket 3b varies further.

Further, the technical scope of the present invention is not limited to the above-described embodiments, and various modifications can be made without departing from the spirit of the present invention.

Figure 5:
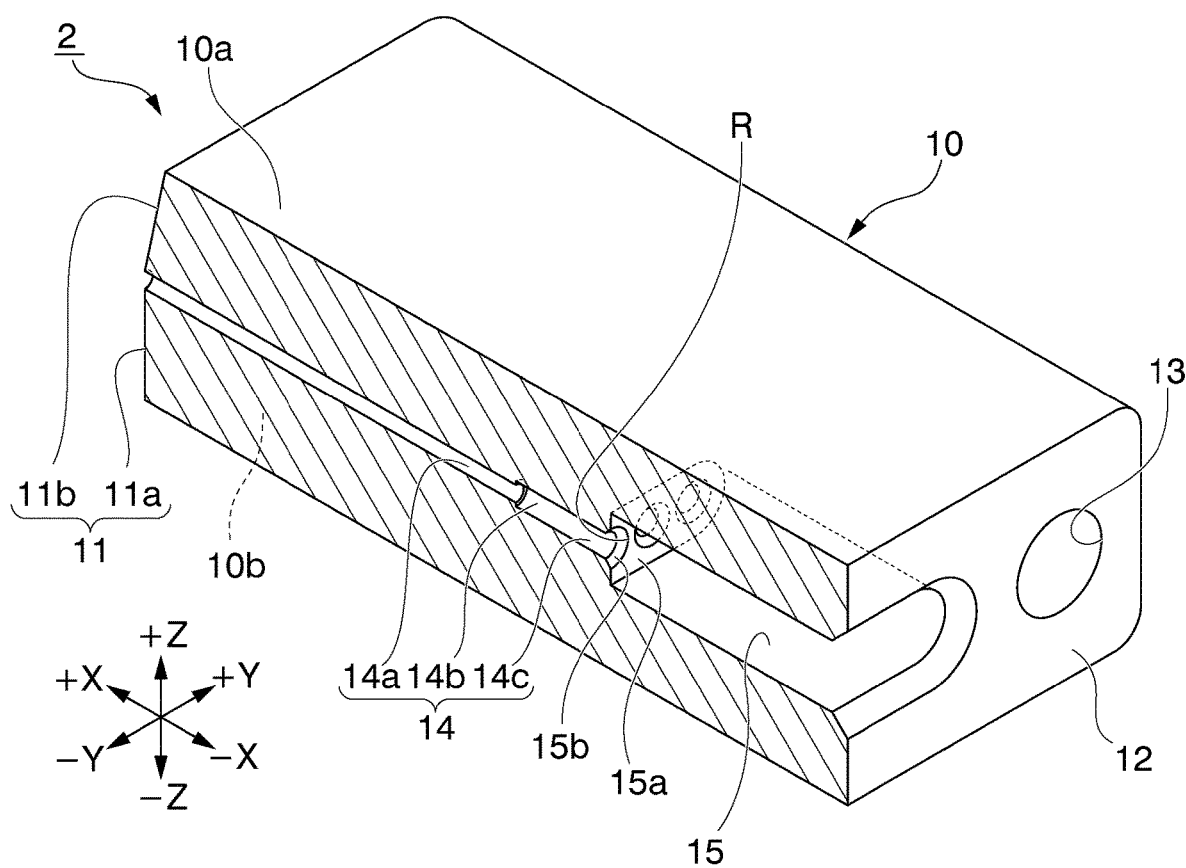
FIG. 5 is a partial cross-sectional view corresponding to FIG. 3, illustrating a ferrule for an optical connector according to one or more embodiments.

For example, as illustrated in FIG. 5, the inclined surface 15b having a conical shape with an inner diameter decreasing in a direction toward the front side may be formed at a rear end portion 14c of the fiber hole 14. In this case, "the rear end opening R of the fiber hole 14" refers to the rear end portion of the inclined surface 15b. When an inner diameter of the rear end portion of the inclined surface 15b is set within a range of 204.6 to 230.0 μm, it is possible to obtain the same effects as described in the above-described embodiments. Further, when the optical fiber 3a is moved forward along the inclined surface 15b, it is possible to insert the optical fiber 3a into the fiber hole 14 more smoothly.

Also, in the above-described embodiments, the rear end opening R of the fiber hole 14 is positioned on the bottom surface 15a of recessed portion 15. However, the rear end opening R of the fiber hole 14 may be positioned on the rear end surface 12 of the ferrule 2 without forming the recessed portion 15.

In addition, the components in the above-described embodiments can be appropriately replaced with well-known components without departing from the spirit of the present invention, and furthermore, the above-described embodiments and modified examples may be appropriately combined.

For example, both the horizontally-long inclined surface 15b illustrated in FIG. 3 and the conical inclined surface 15b illustrated in FIG. 5 may be formed in the ferrule main body 10.

REFERENCE SIGNS LIST

1 Optical connector
2 Ferrule
3 Fiber ribbon
3a Optical fiber
10 Ferrule main body
10a Upper surface
10b Lower surface
11 Connection end surface
14 Fiber hole
14c Rear end portion
R Rear end opening
15b Inclined surface
X Front-rear direction
Y Left-right direction
Z Vertical direction

What is claimed is:

1. A ferrule for an optical connector comprising:
a ferrule main body including:
    a connection end surface;
    an upper surface;
    a lower surface opposite to the upper surface in a vertical direction; and
    fiber holes into which optical fibers are inserted along a front-rear direction perpendicular to the vertical direction, and that are arranged in a left-right direction perpendicular to the vertical direction and the front-rear direction, wherein
the connection end surface is disposed on a front side in the front-rear direction,
an inner diameter of a rear end opening in each of the fiber holes is in a range of 204.6 to 230.0 μm, wherein the rear end opening is disposed on a rear side opposite to the front side in the front-rear direction,
a wall surface covers an entirety of the upper surface and the lower surface,
each of the fiber holes has a rear end portion having a conical inclined surface with the inner diameter that decreases from the rear end opening toward the front side.

2. The ferrule according to claim 1, wherein the inner diameter in each of the fiber holes is 225.0 μm or more.

3. The ferrule according to claim 1, wherein the conical inclined surface of each of the fiber holes is disposed inside the ferrule main body.

* * * * *